US007103909B1

(12) United States Patent
Kondo et al.

(10) Patent No.: US 7,103,909 B1
(45) Date of Patent: Sep. 5, 2006

(54) METHOD OF UNLOCKING PASSWORD LOCK OF STORAGE DEVICE, INFORMATION PROCESSOR, COMPUTER-READABLE RECORDING MEDIUM STORING UNLOCKING PROGRAM, AND CONTROL DEVICE

(75) Inventors: Hisaki Kondo, Kawasaki (JP); Shunichi Okano, Matsumoto (JP); Naomi Yamada, Matsumoto (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/257,052

(22) Filed: Feb. 25, 1999

(51) Int. Cl.
G06F 9/00 (2006.01)
G06F 17/30 (2006.01)
G06F 1/26 (2006.01)
G06F 15/16 (2006.01)
G06F 1/28 (2006.01)

(52) U.S. Cl. ............... 726/2; 726/1; 726/3; 726/26; 726/27; 726/28; 713/1; 713/2; 713/100; 713/165; 713/300; 713/320; 713/324; 713/340

(58) Field of Classification Search ........ 713/200–201, 713/202, 1, 2, 300, 310–340, 100, 165; 709/223–229; 726/1, 2, 3, 26–27, 28
See application file for complete search history.

(56) References Cited

U.S. PATENT DOCUMENTS

| 5,222,231 | A | | 6/1993 | Gunji |
| 5,392,438 | A | | 2/1995 | Gunji |
| 5,430,867 | A | | 7/1995 | Gunji |
| 5,435,005 | A | * | 7/1995 | Saito |
| 5,704,040 | A | | 12/1997 | Gunji |
| 5,812,859 | A | * | 9/1998 | Kamimaki et al. ......... 713/300 |
| 5,845,136 | A | * | 12/1998 | Babcock |
| 5,911,042 | A | * | 6/1999 | Kugue |
| 5,919,263 | A | * | 7/1999 | Kikinis et al. |
| 5,978,923 | A | * | 11/1999 | Kou |
| 6,012,146 | A | * | 1/2000 | Liebenow |
| 6,338,142 | B1 | * | 1/2002 | Alsaadi |

FOREIGN PATENT DOCUMENTS

| EP | 0 793 175 | | 2/1997 |
| JP | 10-149236 | * | 2/1998 |

OTHER PUBLICATIONS

Aker Sharon, Protect Your PowerBook, Oct. 1995, v11, p. 137(2).*
Aker Sharon, Apple Macintosh PowerBook Notebook Computer, Apr. 1994, v10, p. 73(1).*
Varbusiness, Data Security:Fiction or Reality, 1993, n 917, 134.*

* cited by examiner

Primary Examiner—Ayaz Sheikh
Assistant Examiner—Jenise Jackson
(74) Attorney, Agent, or Firm—Staas & Halsey, LLP

(57) ABSTRACT

An information processor equipped with a password storage for storing a password, which is inputted from outside for unlocking a password-locked condition of a storage device when booting the information processor. During a resume process, a controller unlocks the password-locked condition of the storage device using the password previously stored in the password storage. With this arrangement, when the information processor resumes its normal operating condition from a power saving mode, the operator does not need to input a password even if the information processor is installed in an unattended environment or a far remote local area.

27 Claims, 11 Drawing Sheets

METHOD OF UNLOCKING PASSWORD LOCK OF STORAGE DEVICE, INFORMATION PROCESSOR, COMPUTER-READABLE RECORDING MEDIUM STORING UNLOCKING PROGRAM, AND CONTROL DEVICE

BACKGROUND OF THE INVENTION

1. Field of the Invention

The present invention relates to a method of unlocking the password-locked condition of a password-locking storage device of an information processor when the information processor resumes its normal operating condition from its power saving mode. The invention concerns also an information processor to which the method is applied and a computer-readable recording medium in which a program for executing the method is stored.

2. Description of the Related Art

In computer systems such as information processors, e.g., personal computers, some of various types of hard disks to be used as memories have a password lock function that prohibits access to data on the hard disk by setting a password.

If a password is set in the password-locking hard disk, the hard disk assumes a password-locked condition when supply of power is connected to the computer so that access to data stored on the hard disk is not possible until the password-locked condition is unlocked by inputting the same password.

Assuming that supply of power is again connected to a password-locking hard disk after once disconnected for any cause, e.g., when the hard disk is removed from the computer system, the hard disk will be in password-locked condition so that it is inhibited from having access to data stored on the hard disk until this password-locked condition has been unlocked by inputting a preset password.

Generally, in a computer system, a basic input output system program (hereinafter called the BIOS) for controlling various hardware (input and output devices and peripheral devices), such as a keyboard, a display, a floppy disk drive (FDD) and hard disk drive (HDD), is stored in a read only memory (ROM).

Some computer systems are currently known which each has a hard disk having the above-described password lock function, in which the hard disk is set in a password-locked condition by the above-described BIOS program and, when booting the computer system, the user (operator) inputs a password via, for example, the keyboard so that the inputted password is transmitted to the hard disk to unlock the password-locked condition of the hard disk.

The control process of such a conventional computer system (information processing apparatus) in accordance with a CPU (BIOS) when supplying electric power to the computer system will now be described using a flowchart (steps H1–H6) of FIG. 9 of the accompanying drawings of the present application with reference to FIG. 6.

FIG. 6 is a sequence diagram illustrating how to control the hard disk when booting the computer system.

When electric power is supplied to the computer system by, for example, turning a power switch on, a starting process for initializing a system controller, DRAMs and various other devices in the computer system is performed by CPU (BIOS) (step H1). At that time, the BIOS program transmits an INITIALIZE COMMAND to the hard to initialize the hard disk as shown in step B1 of FIG. 6.

Then, CPU discriminates whether the password lock setup of the hard disk is enable or disable (step H2), and if it is disable (see the NO route of step H2), CPU continues the starting process of the computer system (step H6) and then starts an operation system program (OS) and application programs.

If the password lock setup of the hard disk is enable (see the YES route of step H2), BIOS executes displaying on the screen of a display device a direction asking the operator to input a password and waits for input of a password by the operator (step H3).

Now when the operator inputs a password using the keyboard as shown in steps B2–B3 of FIG. 6, BIOS transmits the inputted password to the hard disk by an UNLOCK COMMAND (F2h). The hard disk then collates the inputted password with the password (step H4). If the operator inputs a correct password, namely, if the inputted password coincides with the password previously set in the hard disk (see the YES route of step H4), the password-locked condition of the hard disk is then unlocked (step H5).

Then, BIOS continues the starting process of the computer system (step H6) and further reads the OS, which is stored in the hard disk, to execute a starting process by this OS.

At that time, BIOS transmits a FREEZE COMMAND (F5h) to the hard disk. This FREEZE COMMAND (F5h) is a command for inhibiting any change of the password and any change of setup of the password lock function since then until supply of power to the hard disk is disconnected.

If the inputted password does not coincide with the preset password (see the NO route of step H4), namely, the operator inputs a wrong password in step B3 of FIG. 6, the password-locked condition of the hard disk will not be unlocked and BIOS will continue the starting process of the computer system (step H6), during which the OS stored in the hard disk cannot be read out and hence the starting process in accordance with this OS cannot be executed.

If the operator has inputted a wrong password when the power switch of the above-mentioned conventional computer system is turned on, the password-locked condition of the hard disk will not be unlocked as BIOS continues the starting process of the computer system. Alternatively, if the operator has inputted a wrong password, steps H3 and H4 may be repeated until a correct password is inputted.

In another alternative, a password for unlocking the password-locked condition of the hard disk may be common with that of the computer system; if the operator has inputted a wrong password, the starting process of the computer system will not be continued.

Modern computer systems have the power saving function of reducing power consumption of the computer system by temporarily halting supply of power to the running programs and devices when a power saving switch (such as a suspend switch or a power switch) is turned on or when no further input has been made from a mouse or a keyboard for more than a predetermined time period.

Generally, for a power saving mode in a computer system, there have chiefly been used a suspend method of reducing power consumption to the running programs and devices and a save-to-disk (hibernation) method for storing the contents of a main memory into the hard disk and then shutting off power supply to most of devices. In these individual power saving modes, power supply to the hard disk also is temporarily halted.

The computer system in a power saving mode resumes or restores its normal operating condition in response to an input from outside via a mouse or a keyboard, a receipt of data via a modem or a receipt of a LAN magic packet.

Assuming that supply of power has again been connected to the hard disk according to the resume process after once disconnected according to the power saving mode, the hard disk will be in password-locked condition so that it is impossible to have access to data stored on the hard disk until the password-locked condition of the hard disk is unlocked by inputting a preset password.

The control process of the conventional computer system (information processor) in accordance with CPU (BIOS) when suspending to or resuming from the power saving mode will be described using a flowchart (steps A1–A11) of FIG. 10 with reference to FIGS. 7 and 8.

FIG. 7 is a sequence diagram illustrating control of the hard disk in accordance with BIOS when shifting to the power saving mode (suspend) of the computer system, and FIG. 8 is a sequence diagram illustrating control of the hard disk in accordance with BIOS when resuming from the power saving mode of the computer system.

In the booted computer system, it starts suspending when a power saving switch (such as a suspend switch or a power switch) is turned on or when no further input has been made from a mouse or a keyboard for more than a predetermined time period. CPU (BIOS) firstly transmits an IDENTIFY DRIVE COMMAND (ECh) to the hard disk to request for transmission of information representing the condition of the hard disk, as shown in step C1 of FIG. 7.

Upon receipt of this IDENTIFY DRIVE COMMAND (ECh), the hard disk transmits CONFIGURATION INFORMATION representing the condition of the hard disk, e.g., whether or not setting of a password-locked condition is effective, as shown in step C2 of FIG. 7.

Upon receipt of this CONFIGURATION INFORMATION, BIOS examines from the CONFIGURATION INFORMATION whether or not a password is set with respect to the hard disk and whether or not the hard disk is locked and stores a condition as the examination result of examination in a memory (step A1).

Then, as shown in step C3 of FIG. 7, BIOS executes a power supply shut-off process for the hard disk and a chip set suspend process as well as a suspend process for CPU and other devices (step A2).

The chip set suspend process is a process for adjusting the timing of various signals of chip set {such as control circuits for timer, interrupt, DMA (direct memory access), memory, etc., RTC (real time clock) and bus interface}.

If the save-to-disk (hibernation) method is substituted for the suspend method as the power saving mode, BIOS executes an additional process for storing the contents (condition of the computer system) of a main memory in the hard disk before shifting to the power saving mode.

The chip set suspend process in the save-to-disk (hibernation) method includes a process for reserving in the hard disk configuration information about adjustment of the timing of various signals for chip set (such as control circuits for timer, interrupt, DMA, memory, etc., RTC, and bus interface, etc.) after temporarily expanding the configuration information on the memory.

After the computer system was shifted to its power saving mode, BIOS discriminates whether or not any input has been made from the mouse or the keyboard and whether the power saving switch (such as a suspend switch or a power switch) has been turned on (step A3) and keeps the computer system in its power saving mode until a further input is made (see the NO route of step A3).

Then, when any input is made from the mouse or the keyboard, when data is received via the modem, when a LAN magic packet is received or when the power saving switch is turned on (see the YES route of step A3), CPU (BIOS) starts a resume process restoring its normal operating condition from the power saving mode (suspend) (step A4).

In addition, BIOS performs starting CPU and a chip set resume process (e.g., adjustment of timing of signals for control circuits, which control the timer, interrupt, DMA, memory, etc., RTC, bus interface and other devices) as well as transmits an INITIALIZE COMMAND to the hard disk to turn on the power supply to the hard disk (step A5), as shown in step D1 of FIG. 8.

If the save-to-disk method (hibernation) is used for the power saving mode, the BIOS performs an additional process for expanding the contents (condition of the computer system) of the main memory, which contents were stored in the hard disk before the computer system has been shifted to its power saving mode. The chip set resume process in this case includes not only a process for expanding configuration information about the chip set on the memory, but also a process for storing necessary information in the chip set.

Then BIOS confirms whether the password lock setup of the hard disk as stored in the memory is enable or disable, and if it is disable (see the NO route of step A6), BIOS executes a resume process for devices other than the hard disk, whereupon BIOS executes various controls in accordance with OS.

On the contrary, if the password lock setup of the hard disk is enable (see the YES route of step A6), BIOS correlates with the memory to confirm whether or not the hard disk has been unlocked from a password-locked condition before the computer system entered the power saving mode (step A7).

If the hard disk has been unlocked before the computer system entered the power saving mode (see the YES route of step A7), BIOS instructs the display unit to display a direction requesting the input of a password in order to unlock the password-locked condition of the hard disk to restore its operating condition before the power saving mode, thereby waiting for input of a password by the operator (step A8).

Now, as shown at step D2–D3 in FIG. 8, if a password is inputted by the operator via, for example, a keyboard, BIOS transmits to the hard disk the password inputted in response to the UNLOCK COMMAND (F2h). The hard disk then collates the inputted password with the password previously set in the hard disk (step A9), whereupon the input password coincides with the password previously set in the hard disk (see the YES route of step A9), BIOS unlocks the password-locked condition of the hard disk (step A10).

After continued booting of the computer system (step A11), BIOS reads out the OS, which is stored in the hard disk, and boots the information processor in accordance with this OS.

At that time, BIOS transmits the FREEZE COMMAND (F5h) at step D4 in FIG. 8. This FREEZE COMMAND (F5h) is a command for inhibiting any change of the password and any change of setup of the password lock function since then until supply of power to the hard disk is disconnected.

On the contrary, if the password inputted by the operator at step D3 in FIG. 8 does not coincide with the previously set hard disk, namely, if the operator has inputted a wrong password (see the NO route of step A9), the password-locked condition of the hard disk cannot be unlocked and hence CPU (BIOS) continues the starting process for the computer system (information processor) (step A11). At that time, BIOS cannot read OS stored in the hard disk and hence booting the computer system in accordance with this OS cannot be achieved.

If the operator has inputted a wrong password during the resume process of the above-mentioned conventional computer system, BIOS continues booting the computer system without unlocking the password-locked condition of the hard disk. Alternatively, if the operator has inputted a wrong password, steps A8 and A9 may be repeated until a correct password is inputted.

In another alternative, a common password may be used for unlocking the password-locked condition of the hard disk and for booting the computer system; if the operator has inputted a wrong password, BIOS may not continue resuming the computer system.

If the password-locked condition of the hard disk has not been unlocked before the computer system enters the power saving mode (see the NO route of step A7), BIOS performs a process of step A11 while keeping the password-locked condition of the hard disk without being unlocked.

However, in the foregoing conventional computer system (information processor), if the password lock function of the hard disk is enable, the hard disk assumes a password-locked condition when supply of power to the hard disk has been discontinued in accordance with the power saving mode (such as the suspend method or save-to-disk method) so that either OS or application software cannot have access to data stored in the hard disk until the previously set password (correct password) has been inputted to unlock the password-locked condition. When the information processor is to restore or resumes its normal operation condition from the power saving mode, the operator must input the password at every resume process to unlock the password-locked condition of the hard disk, which is laborious and time-consuming.

Accordingly, assume that various processes accompanied by access to a hard disk, such as automatic reception of facsimile (reception via a modem), automatic process of application software by a timer, and remote access from network environment (reception of LAN magic packet), are performed with respect to a computer system installed in an unattended environment, e.g., in a remote local area. At that time, if both the password lock function of the hard disk and the power saving function of the computer system are set to be enable, it is impossible to resume the normal operating condition from the power saving mode in response to reception of data or the like.

In this case, if the power saving function of the computer system 10 is set to be disable, it is impossible to reduce power consumption, which is non-economical, and, in the meantime, if the password lock function of the hard disk is set to be disable, it is impossible to inhibit any unfair access to data on the hard disk by an unauthorized third party, which is not high enough in security.

SUMMARY OF THE INVENTION

With the foregoing problems in view, it is therefore a first object of the present invention to provide a password lock unlocking method that can unlock a password-locked condition of a storage device, without inputting a password by an operator and also without aid of any attendant or operator, when an information processor, as installed even in an unattended environment or a far-remote local area, resumes or restores its normal operating condition from a power saving mode.

A second object of the invention is to provide an information processor to which the above-described method is applied.

A third object of the invention is to provide a computer-readable recording medium in which a program for executing the above-described method is stored.

A fourth object of the invention is to provide a control device for performing the above-described method.

The first object of the invention above is accomplished by a method of unlocking a password-locked condition of a storage device when an information processor takes a resume process resuming a normal operating condition from a power saving mode, in which during the resume process, the information processor unlocks the password-locked condition of the storage device using a password previously stored in the information processor or in an external source.

The second object of the invention is accomplished by an information processor comprising: a password storage for storing a password, which is inputted from outside in order to unlock a password-locked condition of a storage device, when the information processor takes a starting process; and a controller having a password-lock unlocking function for unlocking a password-locked condition of a storage device using the password, which is stored in the password storage, when the information processor takes a resume process resuming a normal operating condition from a power saving mode.

The third object of the invention is accomplished by a computer-readable recording medium storing a program for instructing a computer to execute a password lock unlocking function of unlocking a password-locked condition of a storage device when the computer takes a resume process resuming a normal operating condition from a power saving mode, wherein when the computer is booted, the program instructs the computer to store a password, which is inputted from outside in order to unlock the password-locked condition of the storage device, in a password storage, and during the resume process, the program instructs the computer to unlock the password-locked condition of the storage device using the password stored in the password storage.

The fourth object of the invention is accomplished by a control device for unlocking a password-locked condition of a storage device in an information processor when the information processor takes a resume process resuming its normal operating condition from a power saving mode, wherein the control device uses a password inputted from outside during the resume process to unlock the storage device from the password-locked condition when booting the information processor.

In the method, the information processor, the computer-readable recording medium and the control device according to the present invention, the password inputted from outside for unlocking the password-locked condition of the storage device is stored when the information processor is booted, and the password-locked condition of the storage device is unlocked, using the stored password, when the information processor resumes its normal operating condition from the power saving mode. As a result, the operator does not need to input a password during the resume process for unlocking the password-locked condition of the storage device, thus reducing power consumption. Further, it is possible to unlock the password-locked condition of the storage device even in an information processor installed in an unattended environment, which is high in usefulness.

DESCRIPTION OF THE PREFERRED EMBODIMENT

(a) Aspect of the Invention

Figure 1:
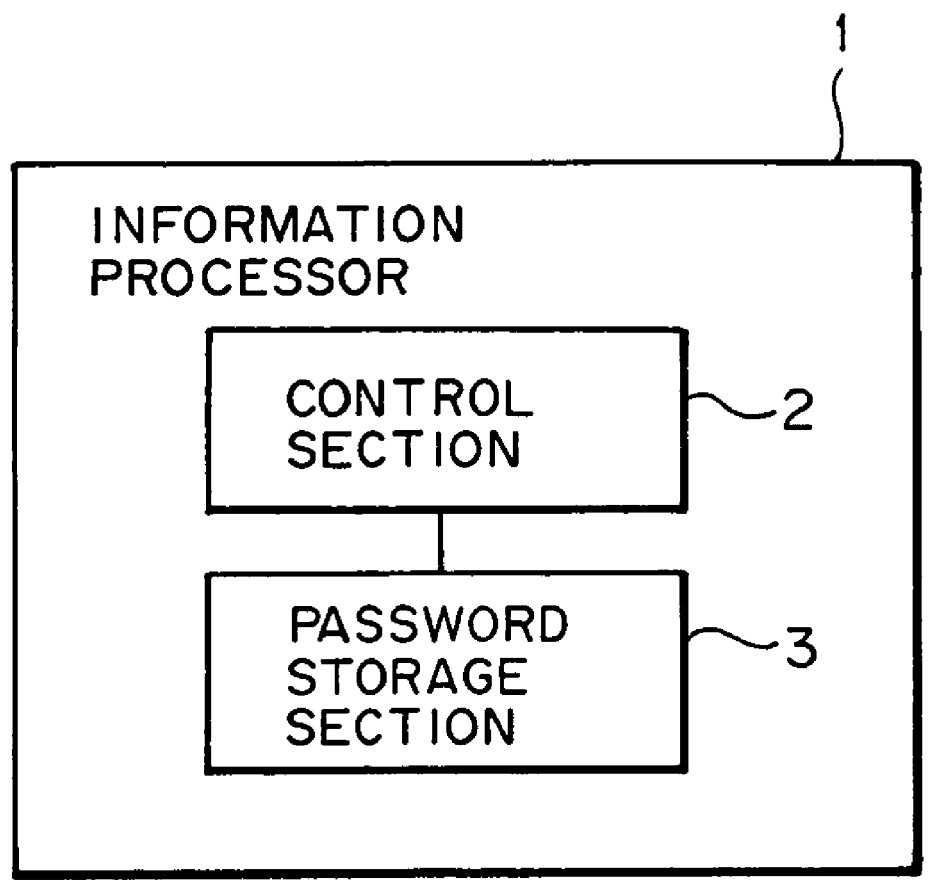
FIG. 1 is a block diagram illustrating the principles of the present invention.

FIG. 1 shows an aspect of the present invention. As shown in FIG. 1, an information processor 1 of the invention comprises a controller 2 for performing a password lock unlocking function, which unlocks a password-locked condition of a storage device when the information processor 1 resumes or restores its normal operating condition from a power saving mode, and a password storage 3 for storing a password, which has been inputted from outside for unlocking the password-locked state of a storage device, when the information processor 1 is booted. When the information processor 1 resumes or restores its normal operating condition from the power saving mode.

The information processor 1 may includes a password lock setup/condition storage for storing information regarding password lock setup/condition of the storage device when the information processor 1 is shifted to the power saving mode. And when the information processor 1 resumes from the power saving mode, the controller 2 may discriminate, in accordance with the information stored in the password lock setup/condition storage, whether or not the password lock state of the storage device should be unlocked.

Further, if the controller 2 recognizes, based on the information stored in the password lock setup/condition storage, that the storage device has been set to be shiftable to the password-locked state and has been in unlocked condition when the information processor 1 is shifted to the power saving mode, the information processor 1 unlocks the password-locked condition of the storage device using the password.

The password storage 3 may be a nonvolatile memory. The storage device may be either a built-in hard disk or an external hard disk of the information processor 1. The password lock setup/condition storage may be a volatile memory.

For a characteristic feature according to a first aspect of the present invention, in the method for unlocking the password-locked condition of the storage device during the resume process in which the information processor 1 restores its normal operating condition from the power saving mode, the information processor 1 stores a password inputted from outside when booting the information processor 1, and then the information processor 1 unlocks the password-locked condition of the storage device during the resume process using the stored password.

For another characteristic feature according to a second aspect of the invention, when shifting to the power saving mode, the information processor 1 may previously obtain information regarding the password lock setup/condition of the storage device, and then when resuming from the power saving mode, the information processor 1 may discriminates whether or not the password-locked condition of the storage device should be unlocked using a password. If the information processor 1 recognizes, based on the obtained information, that the storage device has been set to be shiftable to the password-locked condition and has been in unlocked condition when the information processor 1 is shifted to the power saving mode, the information processor 1 may unlock the password-locked condition of the storage device using the password.

For still another characteristic feature according to a third aspect of the invention, the computer-readable recording medium stores a program for instructing the computer to execute a password lock unlocking function for unlocking the password-locked condition of the storage device when the information processor 1 resumes its normal operating condition from the power saving mode. The program instructs the computer to store in the password storage 3 during the starting process a password inputted from outside for unlocking the password-locked condition of the storage device, and also instructs the computer to unlock the password-locked condition of the storage device during the resume process using the password stored in the password storage 3.

Alternatively, the program may instruct the computer to store in the password lock setup/-condition storage information regarding password lock setup/condition of the storage device when shifting to the power saving mode, and then may instruct the computer to discriminate during the resume process in accordance with the information, which is stored in the password lock setup/condition storage, whether or not the password-locked condition of the storage device should be unlocked using the password.

If the computer recognizes, based on the information stored in the password lock setup/condition storage, that the storage device has been set to be shiftable to the password-locked condition and has been unlocked when the computer is shifted to the power saving mode, the program may instruct the computer to unlock the password-locked condition of the storage device using the password.

For a further characteristic feature according to a fourth aspect of the invention, the control device uses a password inputted during the resume process to unlock the storage device from the password-locked condition when booting the information processor 1.

In the method, the information processor 1, the computer-readable recording medium and the control device according to the present invention, the password inputted from outside for unlocking the password-locked condition of the storage device is stored when the information processor 1 is booted, and the password-locked condition of the storage device is unlocked, using the stored password, when the information processor 1 resumes its normal operating condition from the power saving mode. As a result, the user (operator) of the information processor 1 does not need to input a password during the resume process for unlocking the password-locked condition of the storage device, thus reducing power consumption. Further, it is possible to unlock the password-locked condition of the storage device even in an information processor 1 installed in an unattended environment, which is high in usefulness.

Further, in accordance with information regarding the password lock setup/condition of the storage device, which information has been obtained when shifting to the power saving mode, the information processor 1 discriminates during the resume process whether or not the password-locked condition of the storage device should be unlocked using the password. Only if the information processor 1 recognizes that the storage device has been set to be shiftable to the password-locked condition and has been unlocked when shifting to the power saving mode, the information processor 1 unlocks the password-locked condition of the storage device using the password. And the information processor 1 is inhibited from performing the password lock unlocking function using the password, if the storage device has not been unlocked when shifting to the power saving mode. Thus it is possible to prevent the information processor 1 from unlocking the password-locked condition of the storage device if it is unnecessary to unlock the password-locked condition, thereby improving the reliability of the information processor 1.

Furthermore, according to the information processor 1, since the password storage 3 is a nonvolatile memory, it is possible to make the information processor 1 simple in construction and hence economical. And even if supply of power to the password storage 3 has been stopped because of the power saving mode or for any cause, it is no danger that the password stored in the password storage 3 might disappear, thus improving the reliability of the information processor 1.

Moreover, since the password lock setup/condition storage is a nonvolatile memory, it is also no danger that the information regarding the password lock setup/condition which information stored in the password lock setup/condition storage might disappear even if supply of power to the password lock setup/condition has been stopped because of the power saving mode or for any cause, thus securing an improved degree of reliability of the information processor 1.

(b) Embodiment of the Invention

One embodiment of the present invention in which a computer system (information processor) is used as an electronic device.

Figure 2:
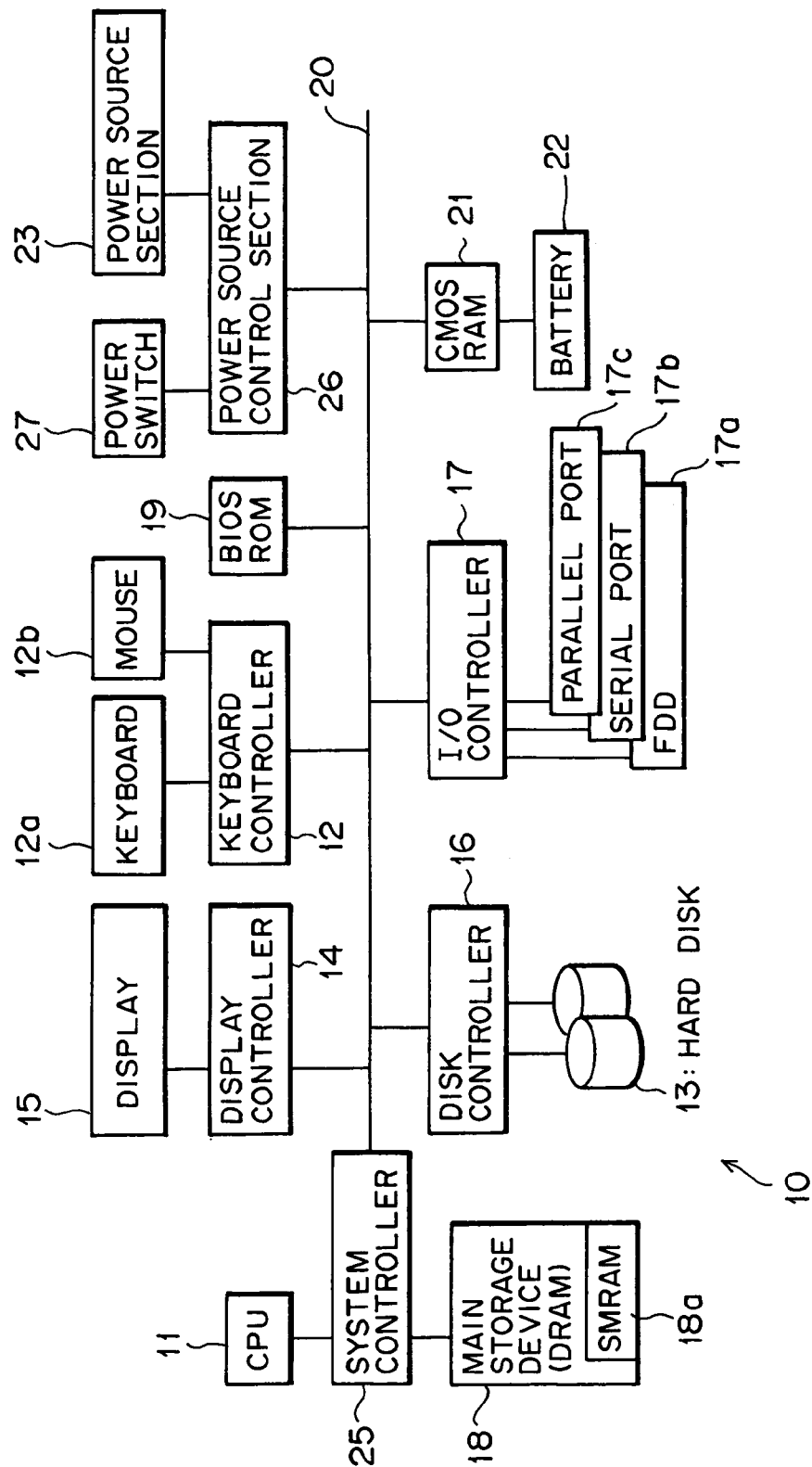
FIG. 2 is a block diagram showing the whole construction of a computer system (information processor) embodying the present invention.

FIG. 2 is a block diagram showing the whole construction of a computer system (information processor) embodying the present invention. The computer system (information processor, such as a personal computer) 10 comprises, as shown in FIG. 2, a CPU (controller) 11, a keyboard controller 12, a hard disk (storage device) 13, a display controller 14, a display (e.g., CRT, LCD) 15, a disk controller 16, an I/O controller 17, a DRAM 18, a BIOS ROM 19, bus 20, a system controller 25, a CMOS RAM (password storage) 21, a power source controller 26, a power switch 27, and a power source section 23.

The hard disk 13 is a storage device built in the computer system 10 and has a password lock function for prohibiting any unfair access to data on the hard disk 13 by a password.

According to this password lock function, if a password is previously set in the hard disk 13, the hard disk 13 assumes a password-locked condition when supply of power to the hard disk 13 is disconnected until the operator or user inputs the previously set password by, for example, the keyboard 12*a* to unlock this password lock, thus inhibiting any access to data stored on the hard disk 13.

Assuming that supply of power is again connected to the hard disk 13 after once disconnected for any cause, e.g., when the hard disk 13 is removed from the computer system 10, the hard disk 13 will be in password-locked condition so that it is inhibited from having access to data stored on the hard disk 13 until this password-locked condition has been unlocked by inputting a preset password.

The hard disk 13 holds the set password and collates the password, which is inputted using the keyboard 12*a*, with the previously set password. The hard disk 13 will be unlocked from the password-locked condition only when the input password coincides with the previously set password, thus allowing access to data on the hard disk 13.

Password lock enable/disable setup of the hard disk 13 can be previously set by, for example, a BIOS setup program.

The password set in the hard disk 13 cannot be recognized from the side of the computer system 10.

In this embodiment of the invention, the hard disk 13 may be mounted in the computer system 10 or may be an external type associated with the computer system 10.

The computer system 10 of this embodiment has two hard disks, which will be called simply the hard disk 13 (hereinafter also called HDD13-1, HDD13-2).

CMOS (Complementary Metal-Oxide semiconductor) RAM (Random Access Memory) 21 reloadably stores BIOS setup information which is system environment setup information. CMOS RAM 21 is battery-backupped by a battery 22 so that power will be supplied to CMOS RAM 21 from the battery 22 when supply of power to CMOS RAM 21 from the power source section 23 is disconnected.

This CMOS RAM 21 stores the password inputted from outside (e.g., the keyboard 12*a*) for unlocking the password-locked condition of the hard disk 13 when booting the computer system 10, thus serving as the password storage 2 of FIG. 1.

Further, CMOS RAM 21 serves as the password setup/condition storage for storing information regarding password lock setup/condition of the hard disk 13 (password lock information) when shifting to the power saving mode.

Namely, CMOS RAM 21 stores the password, which is inputted from the keyboard 12*a* by the operator when the computer system 10 is booted, and also stores the password lock information of the hard disk 13 when the computer system 10 is shifted to the power saving mode.

This password lock information comprises PASSWORD LOCK SETUP INFORMATION as to the password lock setup of the hard disc 13 is enable or disable, PASSWORD LOCK CONDITION INFORMATION as to whether or not the password-locked condition of the hard disk 13 has been unlocked.

Figure 11:
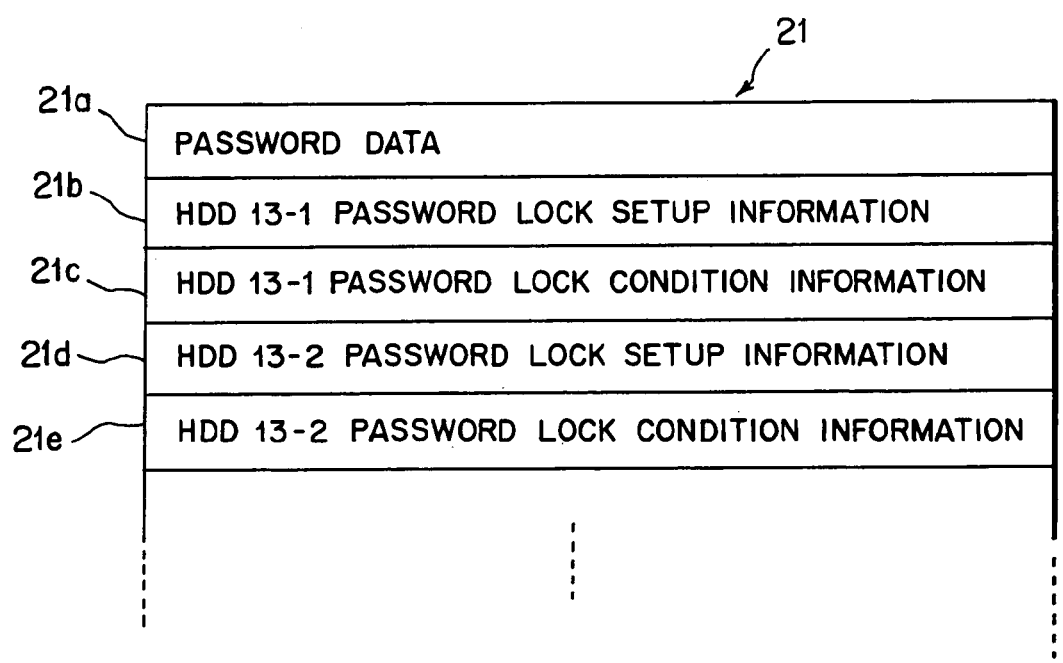
FIG. 11 is a diagram schematically showing the construction of a CMOS RAM in a computer system (information processor) according to one embodiment of the present invention.

FIG. 11 is a diagram schematically showing the construction of CMOS RAM 21 in the computer system (information processor) according to one embodiment of the present invention. As shown in FIG. 11, CMOS RAM 21 has a plurality of storing regions 21*a* through 21*d* in which various kinds of information are to be respectively stored.

For example, in the storing region 21*a*, the password inputted from the keyboard 12*a* or other means when booting the computer system 10 is to be stored, and in the storing region 21*b*, PASSWORD LOCK SETUP INFORMATION of HDD13-1, namely, information as to whether the password lock setup of HDD13-2 is enable or disable is to be stored.

And in the storing region 21*c*, PASSWORD LOCK CONDITION INFORMATION OF HDD13-1, namely, information as to whether or not the password-locked condition of HDD13-1 has been unlocked is to be stored.

Further, in the storing region 21*d*, PASSWORD LOCK SETUP INFORMATION OF HDD13-2, namely, information as to whether the password lock setup of HDD13-2 is enable or disable is to be stored.

Furthermore, in the storing region 21*e*, PASSWORD LOCK CONDITION INFORMATION of HDD13-2, namely, information as to whether or not the password-locked condition of HDD13-2 has been unlocked is to be stored.

CPU 11 performs various operational processes by executing program(s) and in accordance with BIOS (program) read from a below-described BIOS ROM 19 to operate so as to control various kinds of hardware (input/output devices and peripheral devices), such as the keyboard 12*a*, the display 15, a floppy disk drive (FDD) 17*a* and the hard disk 13.

BIOS ROM 19 previously stores BIOS for controlling system environment and is exemplified by EP-ROM (Erasable and Programmable-Read Only Memory).

CPU 11 executes BIOS read from BIOS ROM 19 to control system environment with reference to BIOS setup information stored in CMOS RAM 21. CPU 11 executes also a BIOS setup program to edit the BIOS setup information stored in CMOS RAM 21.

BIOS of this embodiment includes a program for instructing the CPU 11 to execute a password lock unlocking function, which unlocks the password-locked condition of the hard disk 13, during a resume process in which the computer system 10 resumes its normal operating condition from the power saving mode. BIOS executes storing in the storing region 21*a* of CMOS RAM 21 the password inputted from outside via, for example, the keyboard 12*a* when booting the computer system 10, for unlocking the password-locked condition of the hard disk 13. And during the resume process, BIOS executes unlocking the password-locked condition of the hard disk 13 using the password stored in CMOS RAM 21.

BIOS further executes storing in the storing region 21*e* of CMOS RAM 21 information about password lock setup/condition (password lock information) of the hard disk 13 and instructs CPU 11 to discriminates, during the resume process in accordance with the information stored in the CMOS RAM 21, whether or not the password-locked condition of the hard disk 13 should be unlocked using a password. If CPU 11 recognizes that the password lock setup of the hard disk 13 is enable and has been in an unlocked condition when shifting to the power saving mode, BIOS instructs CPU 11 to unlock the password-locked condition of the hard disk 13 using the password.

For the above-mentioned control function, BIOS sets system environment of a personal computer when the personal computer is booted or rebooted, referring to BIOS setup information (hereinafter also called the setup information) stored in CMOS RAM 21.

This BIOS setup information comprises various setup information of system environment, such as hardware environment of setup (enable/disable, IRQ, etc.) for a serial port 17*b*, a parallel port 17*c*, a COM port, a built-in modem (not shown), etc. and software environment of setup for date, time, a processing method at occurrence of POST error, a power saving mode, etc.

Further, BIOS includes a BIOS setup program for editing BIOS setup information stored in CMOS RAM 21 so that CPU (controller) 11 can execute this BIOS setup program to edit the BIOS setup information stored in CMOS RAM 21, based on information inputted from the keyboard 12*a* by the operator.

This setup function is to setup and change environment setup items including operating parameters of the above-mentioned various hardware and system date. For setup by BIOS, CPU 11 reads out BIOS setup information from CMOS RAM 21, outputs a display operation instruction to the display controller 14 for display on the screen of the display 15, and then changes BIOS setup information.

Further, BIOS performs POST (Power-On Self Test) for self-testing the computer system 10 when supply of power to the computer system 10 is connected and the computer system 10 is rebooted. By this POST process, BIOS automatically checks all devices including CPU 11, the hard disk 13, FDD 17*a* and DRAM 18 in the computer system 10 as well as environment setup (setup for date/time, the serial port 17*b*, the parallel port 17*c*, the power saving mode, etc.) in the computer system 10.

By executing BIOS, CPU 11 performs the password lock unlocking function for unlocking the password-locked condition of the hard disk 13 when the computer system 10 resumes its normal operating condition from the power saving mode, thus serving as the controller 1 of FIG. 1.

During the resume process, CPU 11 uses the password stored in the storing region 21*a* of CMOS RAM 21 to unlock the password-locked condition of the hard disk 13.

Namely, by executing BIOS, CPU 11 transmits the password stored in CMOS RAM 21 to the hard disk 13 during the resume process to unlock the password-locked condition of the hard disk 13.

Further, during the resume process, CPU 11 discriminates, in accordance with information regarding password lock setup/condition of the hard disk 13 (password lock information) which information is stored in CMOS RAM 21, whether or not the password-locked condition of the hard disk 13 should be unlocked using the password. Namely, if CPU 11 discriminates, referring to PASSWORD LOCK SETUP INFORMATION stored in the storing region 21*b* (21*d*) of CMOS RAM 21, whether the password lock setup of the hard disk 13 is enable or disable, and if CPU 11 recognized, referring to PASSWORD LOCK CONDITION INFORMATION stored in the storing region 21*c* (21*e*), that the password lock setup of the hard disk 13 is enable and the hard disk 13 has been in an unlocked condition when shifting to the power saving mode, it unlocks the password-locked condition of the hard disk 13 using the password.

In other words, by executing BIOS, CPU 11 confirms during the resume process, with reference to the password lock information stored in CMOS RAM 21, whether the password lock setup of the hard disk 13 is enable and whether the password-locked condition has been unlocked when shifting to the power saving mode.

If the hard disk 13 has been in unlocked condition as the result of confirmation, CPU 11 judges that the password-locked condition of the hard disk 13 should be unlocked and then unlocks the password lock of the hard disk 13 using the password stored in CMOS RAM 21.

DRAM 18 is to be used as a working area where CPU 11 executes various operation processes, for example, CPU 11 stores BIOS read from BIOS ROM 19.

This DRAM 18 has SMRAM (System Management RAM) 18*a* for chiefly a power source management process such as the suspend function and the power saving function.

A power source section 23 supplies electrical power to various devices of the computer system 10 and is controlled by a power source controller 26. As a power switch 27 is turned on by the operator, supply of power is connected to the computer system 10.

The power source controller 26 controls supply of power to various devices in the computer system 10 and, in the power saving mode, it stops supply of power to various devices under control of CPU 11. When the power switch 27 of the computer system 10 is turned on, the power source controller 26 transmits such message and hence supplies electrical power from the power source section 23 to the CPU 11 and various devices.

Figure 4:
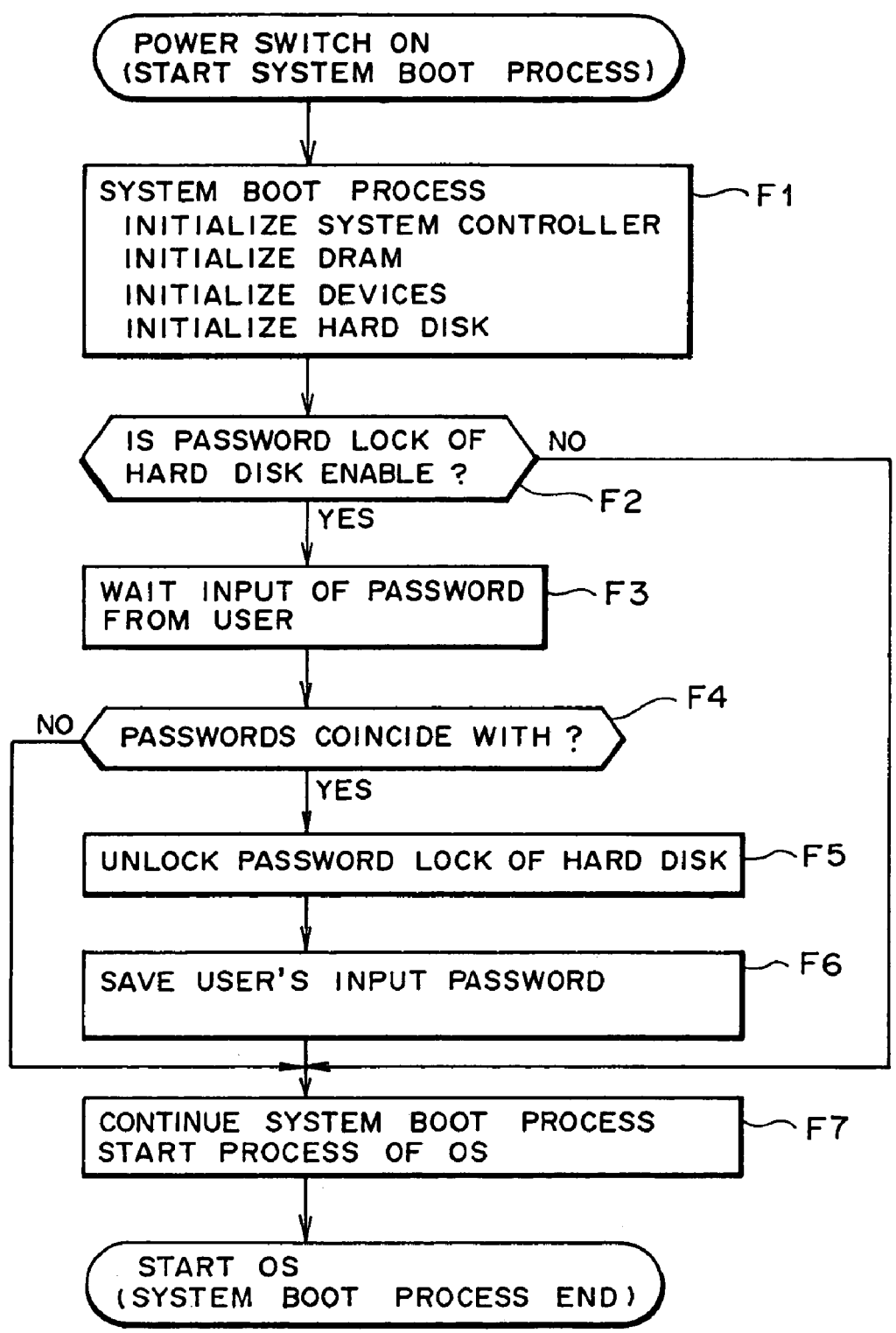
FIG. 4 is a flowchart illustrating a control process in accordance with BIOS when supply of power is connected to the computer system (information processor) of FIG. 2.

The control process by BIOS when supply of power to the thus constructed computer system (information processor) 10 is connected will now be described along with the flowchart (steps F1–F7) of FIG. 4, with reference to FIG. 6.

When the power switch 27 of the computer system 190 is turned on, the power source controller 26 transmits this message to CPU 11 and supplies electrical power from the power source section 23 to CPU 11 and various devices. Then CPU 11 (BIOS) performs a system boot process for initializing the system controller 25, DRAM 18 and various devices in the computer system 10 (step F1). At that time, as shown in step B1 of FIG. 6, BIOS transmits an INITIALIZE COMMAND to the hard disk 13 to initialize the hard disk 13.

Subsequently, CPU 11 discriminates, with reference to the password lock information stored in CMOS RAM 21 (storing region 21*b*), whether or not the password lock setup of the hard disk 13 is enable (step F2). If the password lock setup of the hard disk 13 is disable (see the NO route of step F2), CPU 11 firstly continues the system boot process (step F6) and then starts OS and applications.

On the contrary, if the password lock setup of the hard disk 13 is enable (see the YES route of step F2), BIOS displays on the screen of the display 15 a direction requesting the operator to input a password and waits for input of a password by the operator (step F3).

Figure 6:
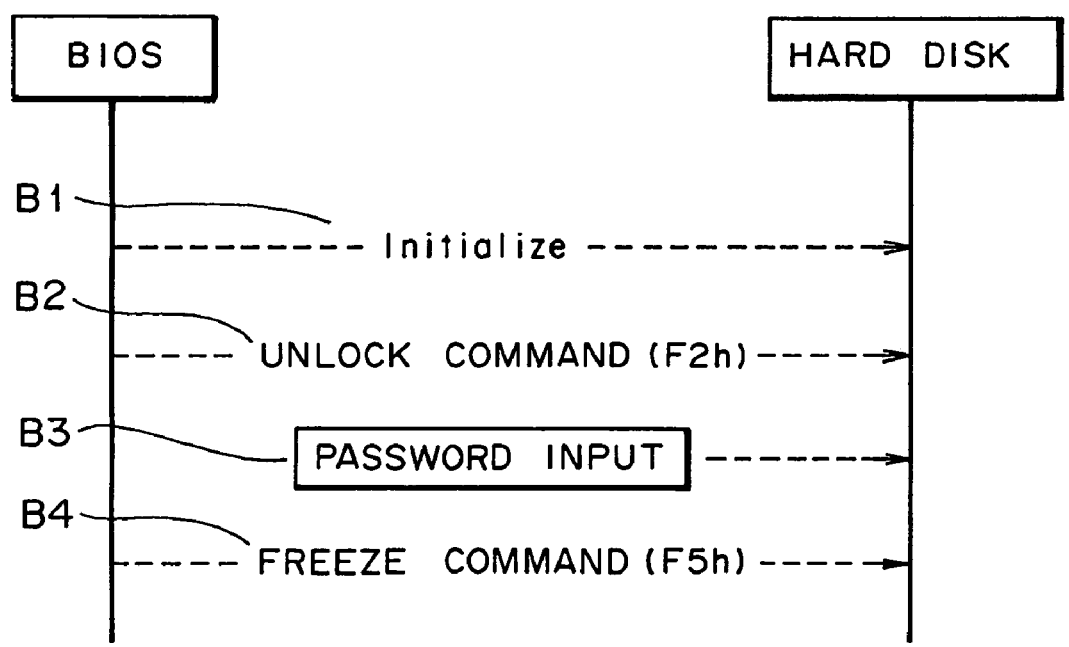
FIG. 6 is a sequence diagram illustrating the manner in which the hard disk is controlled when the computer system (information processor) is booted.

As shown in steps B2–B3 of FIG. 6, when the operator inputs a password using the keyboard 12*a*, BIOS transmits the password to the hard disk 13 by an UNLOCK COMMAND (F2h). The hard disk 13 collates the inputted password with the previously set password (step F4). If the inputted password coincides with the password previously set in the hard disk 13, namely, if the operator has inputted a correct password (see the YES route of step F4), BIOS unlocks the password lock of the hard disk 13 (step F5) and stores in the storing region 21*a* of CMOS RAM 21 the password inputted by the operator (step F6).

BIOS continues the starting process of the computer system 10 (step F7) and also reads out OS stored in the hard disk 13, thus executing the starting process in accordance with this OS.

At that time, BIOS transmits a FREEZE COMMAND (F5h), as shown in step B4 of FIG. 6, in order to inhibit either changing the password with another or changing the setup of password lock function since then until supply of power to the hard disk 13 is disconnected.

On the contrary, if the password inputted by the operator in step B3 of FIG. 6 does not coincide with the password previously set in the hard disk 13, namely, if the operator has inputted a wrong password (see the NO route of step F4), the hard disk 13 will not unlock the password lock and continues the starting process of the computer system 10 (step F7), during which OS stored in the hard disk 13 cannot be read out and hence the starting process in accordance with this OS cannot be performed.

If the operator has inputted a wrong password when supply of power to the computer system 10 of the foregoing embodiment is connected, BIOS will continue booting the computer system 10 without unlocking the password-locked condition of the hard disk 13. Alternatively, if the operator has inputted a wrong password, BIOS may repeat steps F3 and F4 until a correct password is inputted.

In another alternative, a password for unlocking the password-locked condition of the hard disk 13 may be common with that of the computer system 10; if the operator has inputted a wrong password, the starting process of the computer system 10 will not be continued.

How to control the hard disk 13 by BIOS during the suspend process, in which the computer system (information processor) 10 according to the embodiment of the present invention is shifted to the power saving mode, and during the resume process, will now be described along with the flowchart (steps G1–G10) of FIG. 5, with reference to FIGS. 3 and 7.

Figure 3:
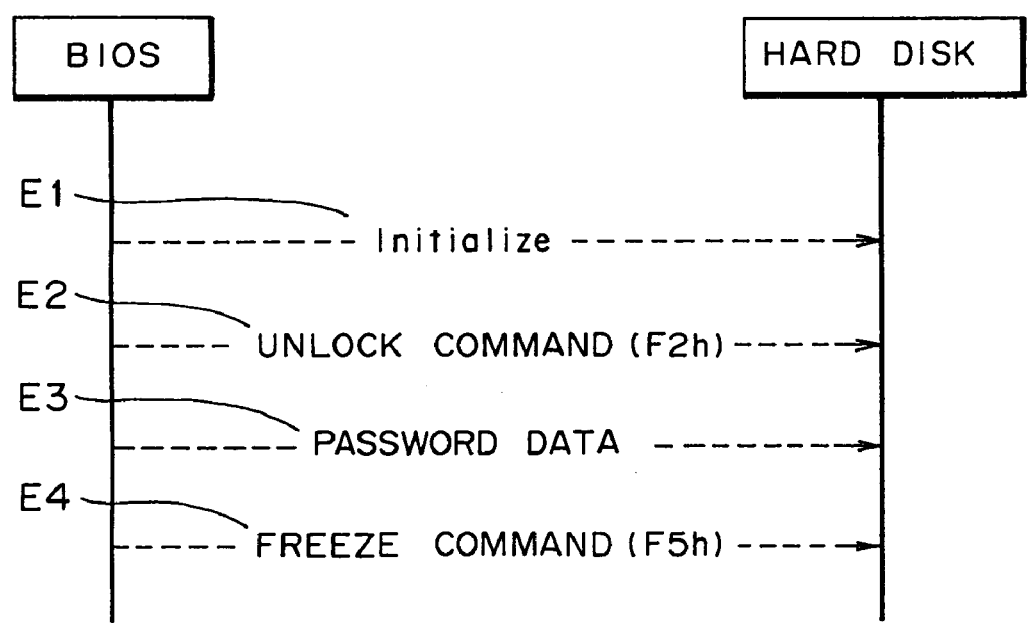
FIG. 3 is a sequence diagram illustrating the manner in which a hard disk is controlled when the computer system (information processor) of FIG. 2 resumes from a power saving mode.

FIG. 3 is a sequence diagram illustrating the manner in which the hard disk is controlled when the computer system (information processor) resumes from the power saving mode.

Figure 7:
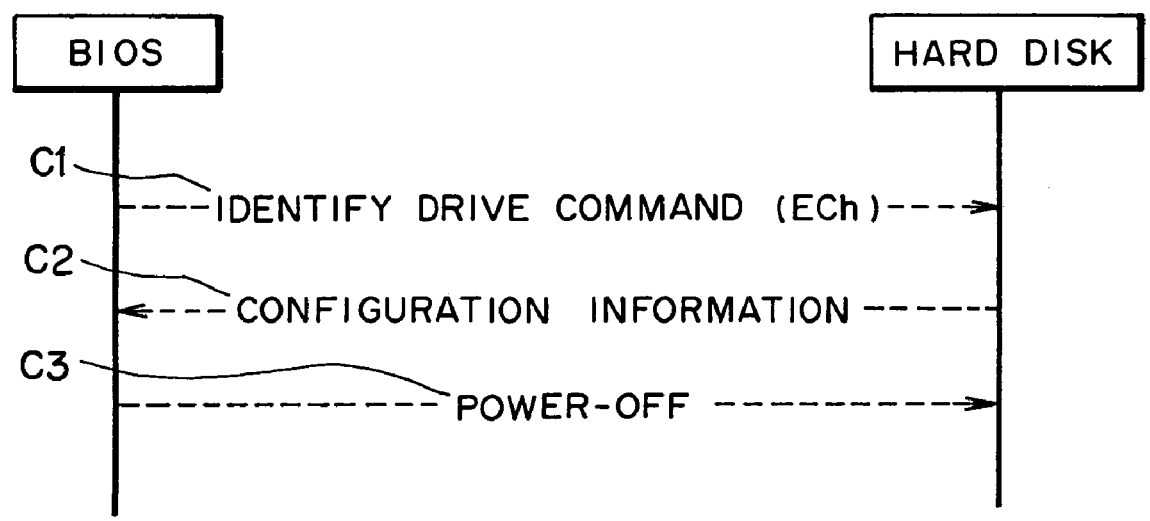
FIG. 7 is a sequence diagram illustrating the manner in which a hard disk is controlled in accordance with BIOS during a suspend process in which a conventional computer system (information processor) is shifted to a power saving mode.
Figure 8:
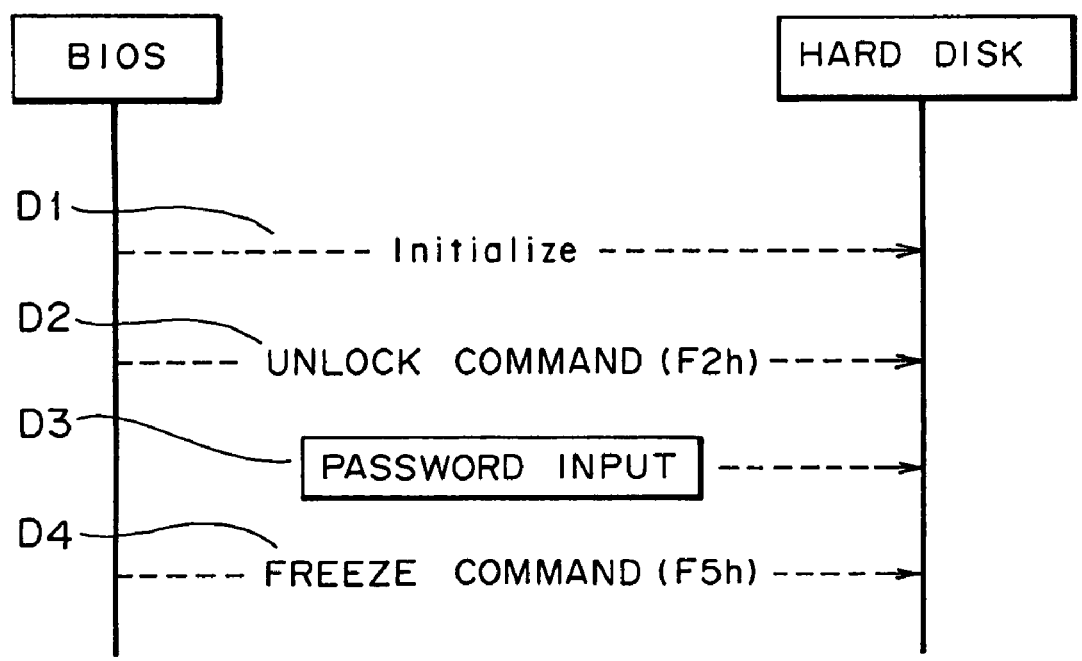
FIG. 8 is a sequence diagram illustrating the manner in which the hard disk is controlled in accordance with BIOS during a resume process in which the conventional computer system (information processor) resumes from the power saving mode.
Figure 9:
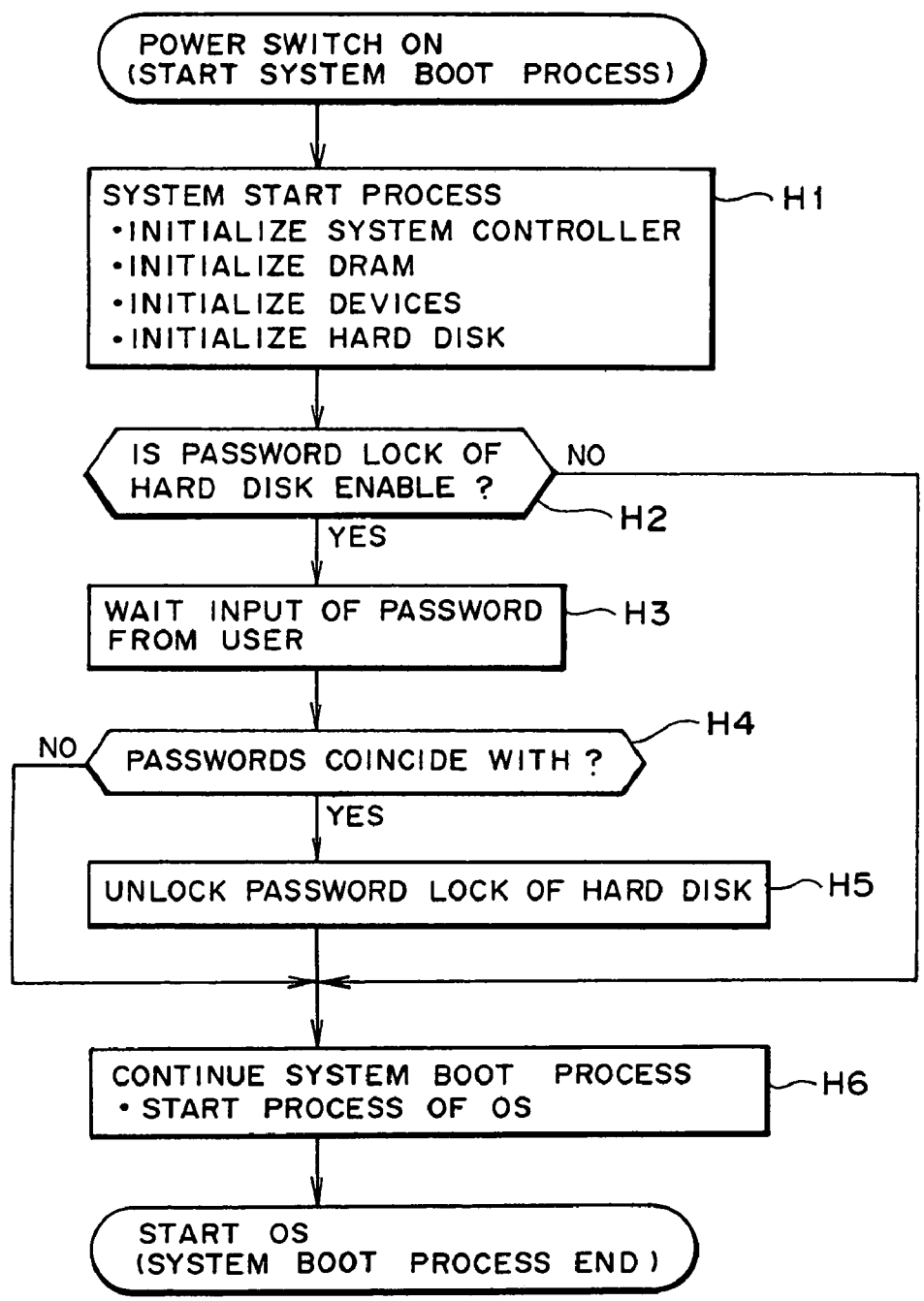
FIG. 9 is a flowchart illustrating the manner in which the hard disk is controlled in accordance with CPU (BIOS) when supply of power is connected to the conventional computer system (information processor)
Figure 10:
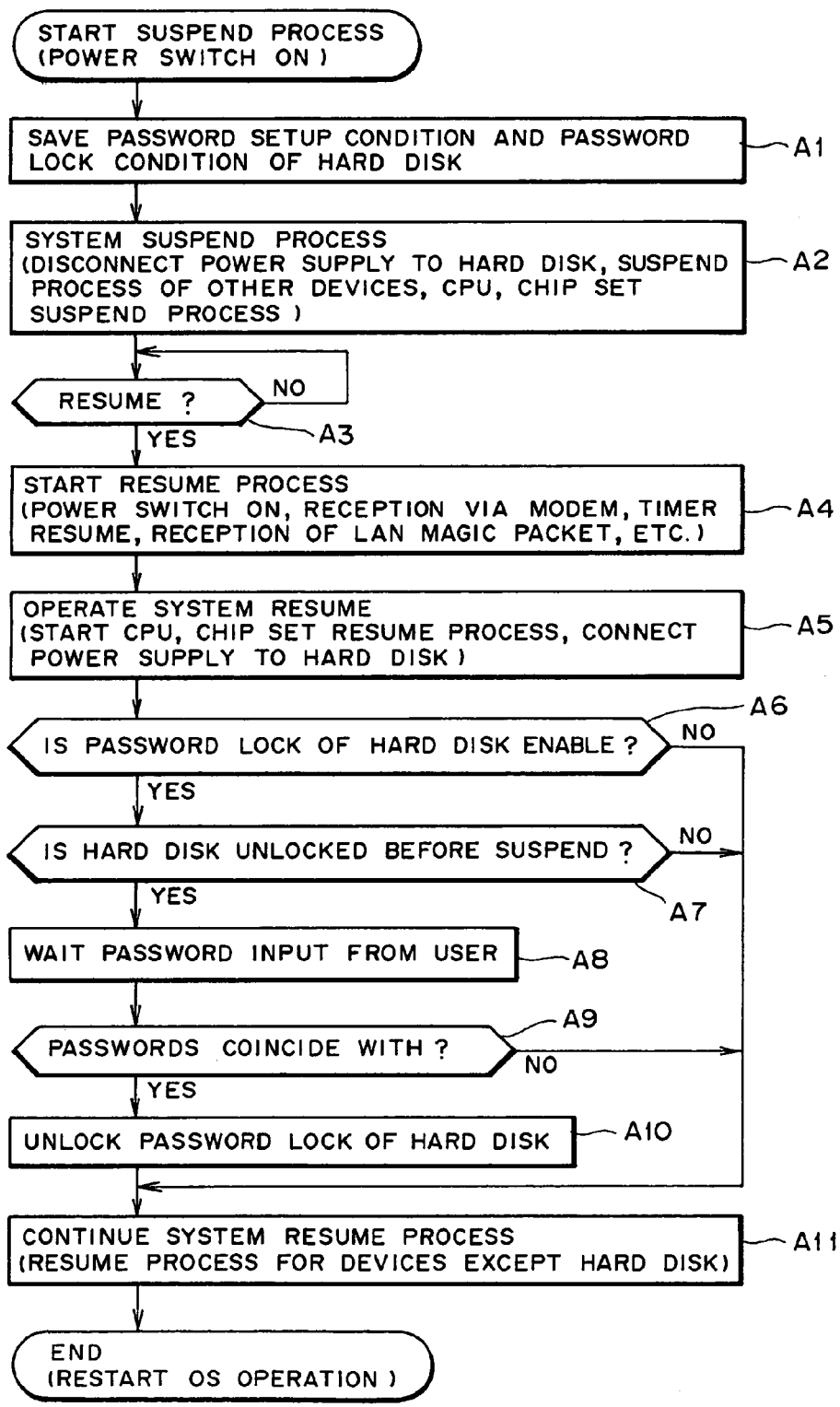
FIG. 10 is a flowchart illustrating the manner in which the hard disk is controlled in accordance with CPU (BIOS) during a suspend process in which the conventional computer system (information processor) is shifted to the power saving mode and a resume process in which the conventional computer system (information processor) resumes from the power saving mode.

In the booted computer system 10, if a power saving switch (such as a suspend switch or the power switch 27) is turned on, or if no further input has been made for more than a predetermined time period from either the mouse 12*b* or the keyboard 12*a*, the computer system 10 starts the suspend process so that CPU 11 (BIOS) firstly transmit an IDENTIFY DRIVE COMMAND (ECh) to the hard disk 13, as shown in step C1 of FIG. 7, to request the hard disk 13 to transmit information representing the condition of the hard disk 13.

Upon receipt of this IDENTIFY DRIVE COMMAND (ECh), the hard disk 13 transmits to CPU 11 (BIOS) CONFIGURATION INFORMATION representing the status of the hard disk, such as whether or not the setup of password lock of the hard disk is enable, as shown in C2 of FIG. 7.

Upon receipt of this CONFIGURATION INFORMATION, BIOS discriminates from it whether the password lock setup of the hard disk is enable or disable and whether the hard disk has been locked, and stores in CMOS RAM 21 the information regarding such setup and condition as the password lock information (step G1).

Specifically, BIOS stores in the storing region 21b (21d) of the hard disk 13 information as to whether the password lock setup of the hard disk 13 is enable or disable as PASSWORD LOCK SETUP INFORMATION and also stores in the storing region 21c (21e) of the hard disk 13 information as to whether or not the password-locked condition of the hard disk 13 has been unlocked as PASSWORD LOCK CONDITION INFORMATION.

Further, as shown in step C3 of FIG. 7, BIOS disconnects supply of power to the hard disk 13 and performs a chip set suspend process and the suspend process of CPU 11 and other devices (step G2).

The chip set suspend process is a process for adjusting the timing of various signals of a chip set (control circuit for timer, interrupt, DMA (Direct Memory Access), DRAM 18, CMOS RAM 21, etc., RTC (Real Time Clock), and bus interfaces).

Figure 5:
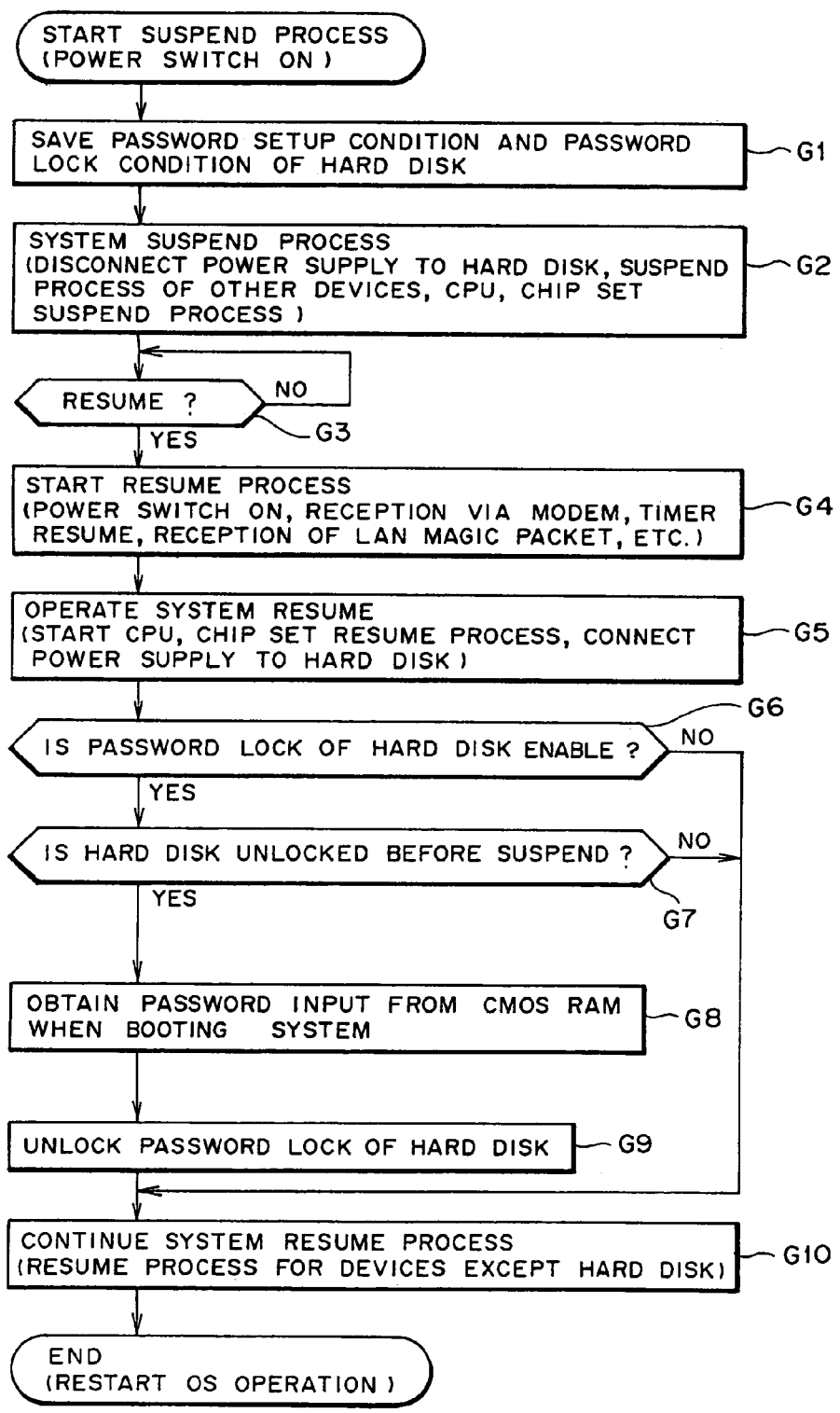
FIG. 5 is a flowchart illustrating the manner in which the hard disk is controlled in accordance with BIOS during a suspend process, in which the computer system (information processor) is shifted to a power saving mode, and a resume process, in which the computer system (information processor) restores from the power saving mode, according to one embodiment of the invention.

In the embodiment of FIG. 5, the suspend method is adopted as the power saving mode. The power saving mode should by no means be limited to the suspend method and may alternatively be the save-to-disk method (hibernation).

If the save-to-disk method (hibernation) is substituted for the suspend method as the power saving mode, it includes an added process for storing the content (system condition) of DRAM 18 in the hard disk 13 before the computer system 10 is shifted to the power saving mode.

The chip set suspend process in the case of save-to-disk method (hibernation) includes an added process for temporarily expanding on DRAM 18 configuration information regarding timing adjustment of various signals of a chip set (control circuit for timer, interrupt DMA, DRAM 18, etc., RTC, and bus interfaces) and then stores the expanded information in the hard disk 13.

After the computer system 10 has been shifted to the power saving mode (suspend), BIOS discriminates whether or not the power saving switch (such as suspend switch or the power switch 27) has been turned on and whether or not a further input has been made from the mouse 12b or the keyboard 12a (step G3) and maintains the computer system 10 in the power saving mode (suspend) until such input is made (see the NO route of step G3).

If reception of any input via the mouse 12b or the keyboard 12a, reception via modem, reception of LAN magic packet or turn-on of the power saving switch (such as the power switch 27) has been made (see the YES route of step G3), CPU 11 (BIOS) starts the resume process in which the computer system 10 restores its normal operating condition from the power saving mode (suspend) (step G4).

Then BIOS performs the start process of CPU 11 and the chip set resume process (such as timing adjustment of various kinds of signals of chip set) and transmits an INITIALIZE COMMAND to the hard disk 13, as shown in step E1 of FIG. 3, to connect the supply of power to the hard disk 13 (step G5).

If the save-to-disk method (hibernation) is adopted as the power saving function, BIOS performs a further process in which the content of DRAM 18 (system condition), which is stored in the hard disk 13 before the computer system 10 is shifted to the power saving mode, is again expanded on DRAM 18. In this case, the chip set resume process includes an added process in which configuration information for timing adjustment of various kinds of signals of chip set is expanded on DRAM 18 and necessary information is stored in the chip set.

Then CPU 11 (BIOS) examines the password lock setup information stored in the storing region 21b (21d) of CMOS RAM 21 and confirms whether the password lock setup of the hard disk 13 is enable (step G6). If the password lock setup of the hard disk 13 is disable (see the NO route of step (G6), BIOS performs the resume process for the devices other than the hard disk 13, whereupon BIOS performs various kinds of control in accordance with the control in accordance with OS (step G5).

On the contrary, if the password lock setup of the hard disk 13 is enable (see the YES route of step G6), CPU 11 (BIOS) confirms, referring to the password lock condition information stored in CMOS RAM 21 (storing region 21c (21e)), whether or not the password-locked condition of the hard disk 13 has been unlocked before entering the power saving mode (suspend) (step G7).

If the password-locked condition of the hard disk 13 has been unlocked before entering the power saving mode (suspend) (see the YES route of step G7), BIOS transmits an UNLOCK COMMAND (F2h) to the hard disk 13 and further reads out the password, which has been inputted by the operator during the starting process and has been stored in the CMOS RAM 21 (step G8).

Then BIOS unlocks the password-locked condition of the hard disk 13 to restore the original condition before the power saving mode and transmits this password to the hard disk 13 to unlock the password-lock condition of the hard disk 13, as shown in step E3 of FIG. 3 (step G9).

At that time, BIOS transmits a FREEZE COMMAND (F5h), as shown in step E4 of FIG. 3, in order to inhibit either changing the password with another or changing the setup of password lock function since then until supply of power to the hard disk 13 is disconnected.

Then BIOS executes a process of step G10.

If the password-locked condition of the hard disk 13 has not been unlocked before entering the power saving mode (see the NO route of step G7), BIOS executes the process of step G10 with the hard disk 13 kept in the password-locked condition.

If the hard disk 13 has been detached from the computer system 10 after the resume process when the password-locked condition has been unlocked during the resume process, in which the computer system 10 restores from the above-mentioned power saving mode, supply of power to the hard disk 13 is disconnected. The hard disk 13 will therefore be in the password-locked condition so that any unfair access to the hard disk 13 by an unauthorized person can be inhibited, thereby improving the reliability of data security of the computer system 10.

In the foregoing embodiment, data security of the computer system 10 is accomplished only by the password lock function of the hard disk 13. This invention should by no means be limited to this illustrated example and various modifications may be suggested without departing from the scope of the present invention.

For example, the password function of BIOS and/or OS may be set independently of the password lock function of the hard disk 13 so that any unfair access to the hard disk 13 by an unauthorized third party can be inhibited, thus improving the reliability of data security of the computer system 10.

The password to be set in the hard disk 13 may be either identical with or different from the password to be set in BIOS and/or OS.

Thus according to the information processor of the embodiment of the present invention, in using the computer system 10 having the password-locking hard disk 13 with the password lock function effectively set, since CPU 11 (BIOS) unlocks the password lock utilizing a password stored in CMOS RAM 21 (storing region 21a) when resuming the normal operating condition from the power saving mode, it is unnecessary that the operator inputs the password during the resume process, which would have been laborious and time-consuming.

Particularly in a computer system 10 installed in an unattended environment such as in a far remote local area, it is possible to unlock the password-locked condition of the hard disk 13, which condition is due to the power saving mode, by automatic reception of facsimile (reception via a modem), automatic process of application by a timer or remote access from network environment (reception of LAN magic packet), simultaneously with the resume process so that OS can access to the data stored in the hard disc 13.

It is therefore possible to utilize both the power saving function of the computer system 10 and the password lock function of the hard disk 13 by setting these two functions enable.

Since the power saving function of the computer system 10 can be utilized as effectively set, it is possible to reduce power consumption, which is economical. On the other hand, since the password lock function of the hard disk 13 can be utilized as effectively set, it is possible to inhibit any unfair access to data of the hard disk 13 by an unauthorized third party, thus realizing data security of the hard disk 13.

Further, since with its power saving mode made enable, the computer system 10 equipped with the hard disk 13 having a password lock function can execute automatic reception of facsimile and automatic process of application by a timer, thus improving the efficiency of use of computer system 10.

In this embodiment, CMOS RAM 21 serves as the password storage and the password lock setup/condition storage. The present invention should by no means be limited to this example.

For example, SMRAM 18a may be used as the password storage and the password lock setup/condition storage so that any unfair access to the password lock information by an unauthorized third party, thus improving the security of password.

Alternatively, both CMOS RAM 21 and SMRAM 18a may be used as the password storage and the password lock setup/condition storage. For example, in the normal power saving mode (suspend), the password and the password lock information are stored in SMRAM 18a, while in the save-to-disk mode (hibernation), the password and the password lock information are stored in CMOS RAM 21. When resuming the normal operating condition from the save-to-disk mode, BIOS reads out the password and the password lock information from CMOS RAM 21 and stores the same in SMRAM 18a and, at the same time, erases the password and the password lock information of the CMOS RAM 21. Thus SMRAM 18A and CMOS RAM 21 may be used for different purposes.

Further, either the password storage or the password lock setup/condition storage should not be limited to CMOS RAM 21 backupped by a battery and a nonvolatile memory such as NVRAM (Non-volatile RAM) may be used.

Furthermore, NVRAM (CMOS RAM) or the like serving as the password storage and the password lock setup/condition storage may be provided independently of the CMOS RAM 21 and SMRAM 18a.

Moreover, in the information processor of the foregoing embodiment, the hard disk 13 serves as the storage device. A flush memory or various alternatives may be used as the storage device.

In the foregoing embodiment, the computer system 10 has two hard disks 13 (HDD13-1, HDD13-2). The computer system 10 should by no means be limited to this example.

Further, in this embodiment, a common password is set for HDD13-1 and HDD3-2 and is stored in the storing region 21a of CMOS RAM 21. Alternatively two different passwords may be set for HDD13-1 and HDD13-2, and two storing regions for storing these two passwords may be formed in CMOS RAM 21.

Furthermore, in this embodiment, the computer system (information processor) is used as one example of an electronic device. The electronic device may be any other form.

The present invention is not limited to the specifically described embodiment, and various changes and modifications may be made without departing from the sprits of the present invention. For example, the present invention is applicable to a device, equipment or an apparatus which substantially processes a kind of information, such as a personal digital assistance (PDA) or an electronic device having a processor and a storage device. The term "information processor" in this specification means any information processor inclusive of various kinds of electronic devices and apparatuses which substantially process any kind of information.

What is claimed is:

1. An information processor, comprising:
   a password input unit inputting a password for unlocking a password-locked condition of a storage device when the information processor performs an initial start-up process for the information processor;
   a password storage storing the password at said initial start-up process, said password being input by the password inputting unit; and
   a controller reading the password input by the user from the password storage and unlocking the password-locked condition of the storage device using the password stored in the password storage when the information processor performs a resume operation resuming a normal operating condition from a power saving mode where the storage device has power resumed from a cut off in the power saving mode where the password-locked condition existed, thereby overriding the password protection of the storage device during the resume process.

2. An information processor according to claim 1, further comprising a password lock setup/condition storage storing information relating to a password lock setup/condition of the password storage, the controller being operable to determine, in accordance with the information stored in the password lock setup/condition storage, whether or not the password-locked condition of the storage device should be unlocked using the stored password.

3. An information processor according to claim 1, further comprising a password lock setup/condition storage storing information relating to a password lock setup/condition of the storage device when the information processor shifts to the power saving mode, the controller being operable to determine, during the resume process and in accordance with the information stored in the password lock setup/ condition storage, whether or not the password-locked condition of the storage device should be unlocked using the stored password.

4. An information processor according to claim 2, wherein if the controller recognizes, based on the information, that the storage device is unlocked before the shift to the power saving mode and becomes password-locked at the time of the shift to the power saving mode, the controller unlocks the password-locked condition of the storage device using the stored password.

5. An information processor according to claim 1, wherein the password storage is a nonvolatile memory.

6. An information processor according to claim 1, wherein the storage device is a hard disk mounted in the information processor.

7. An information processor according to claim 1, wherein the storage device is an external hard disk adapted to be connected to the information processor.

8. An information processor according to claim 2, wherein the password lock setup/condition storage is a nonvolatile memory.

9. An information processor according to claim 3, wherein the password lock setup/condition storage is a nonvolatile memory.

10. A control device for unlocking a password-locked condition of a storage device used for an information processor when the information processor performs a resume operation resuming its normal operating condition from a power saving mode where power to the storage device was cut off and the storage device existed in the password-locked condition, the control device comprising:
   a password input unit inputting a password for unlocking the password-locked condition of the storage device when said information processor performs an initial start-up process;
   a storing control unit storing the password in a password storage at said initial start-up process; and
   an unlocking unit unlocking the password-locked condition of the storage device using the password stored in the password storage, during the resume operation where power to the storage device is restored, thereby overriding the password protection of the storage device during the resume process.

11. A control device according to claim 10, wherein the unlocking unit unlocks the password-locked condition of the storage device using the password which is input in the password storage when the information processor performs a starting operation.

12. A control device according to claim 10, wherein the control device is operable to determine, during the resume operation and in accordance with information regarding a password lock setup/condition of the storage device, whether or not the password-locked condition of the storage device should be unlocked using the password.

13. A control device according to claim 10, wherein the control device is operable to determine, during the resume operation and in accordance with information regarding a password lock setup/condition of the storage device when the information processor shifts to the power saving mode, whether or not the password-locked condition of the storage device should be unlocked during the resume operation using the password.

14. A control device according to claim 13, wherein if the control device recognizes, based on the information regarding the password lock setup/condition of the storage device, that the storage device is unlocked before the shift to the power saving mode and becomes password-locked at the time of the shift to the power saving mode, the control device unlocks the password-locked condition of the storage device using the password.

15. A control device according to claim 10, wherein the control device is operable to store the password into a nonvolatile memory when booting the information processor, and the control device is operable to unlock the password-locked condition of the storage device using the password stored in the nonvolatile memory.

16. A control device according to claim 10, wherein the control device is operable to store the password into a hard disk mounted in the information processor, when booting the information processor, and the control device is operable to unlock the password-locked condition of the storage device using the password stored in the hard disk.

17. A control device according to claim 10, wherein the control device is operable to store the password into an external hard disk connected to the information processor, when booting the information processor, and the control device is operable to unlock the password-locked condition of the storage device using the password stored in the external hard disk.

18. A control device according to claim 17, wherein the control device is operable to store the information into a nonvolatile memory during the resume operation, and the control device is operable to determine, in accordance with the information stored in the nonvolatile memory, whether or not the password-locked condition of the storage device should be unlocked using the password.

19. A computer-readable recording medium storing a program for instructing a computer to execute a password lock unlocking operation of unlocking a password-locked condition of a storage device when the computer performs a resume operation resuming a normal operating condition from a power saving mode where power to the storage device is cut off and the device enters the password-locked condition and said processor continues to operate, said recording medium comprising a process of:
   inputting a password for unlocking the password-locked condition of the storage device when said information processor performs an initial start-up process;
   storing the password in a password storage at said initial start-up process; and
   unlocking the password-locked condition of the storage device during the resume operation, using the password stored in the password storage, thereby overriding the password protection of the storage device during the resume process.

20. A computer-readable recording medium according to claim 19, further comprising a process of:
   referring to information relating to a setup/condition of the password lock of the storage device; and
   determining, in accordance with the referred to information, whether or not the password-locked condition of the storage device should be unlocked using the previously stored password, thereby overriding the password protection of the storage device during the resume process.

21. A computer-readable recording medium according to claim 19, further comprising a process of:
   referring to information relating to a setup/condition of the password lock of the storage device when the computer shifts to the power saving mode; and
   determining, in accordance with the referred to information, whether or not the password-locked condition of the storage device should be unlocked using the previously stored password during the resume operation.

22. A computer-readable recording medium according to claim 20, further comprising a process of unlocking the password-locked condition of the storage device using the password when the referred to information indicates that the storage device is unlocked before the shift to the power saving mode and becomes password-locked at the time of the shift to the power saving mode.

23. A method for unlocking a password-locked storage device of an information processor in a resume operation from a power saving mode where the processor continues to operate and power to the storage device is cut off causing the storage device to enter the password-locked condition, comprising:

inputting of a password by a user for unlocking the password-locked condition of the storage device when said information processor performs an initial start-up process for the information processor;

storing the password in a password storage at said initial start-up process;

reading the stored password when the information processor performs the resume process to resume from the power saving mode and restore power to the storage device; and unlocking the password-locked storage device using the read password during the resume process, thereby overriding the password protection of the storage device during the resume process.

24. A method, for an information processor, for unlocking a password-locked condition of a storage device when said information processor performs a resume operation resuming a normal operation condition from a power saving mode where said processor continues to operate and power to the storage device is cut off causing the storage device to enter the password-locked condition, comprising:

inputting of a password by a user for unlocking the password-locked condition of the storage device when said information processor performs an initial start-up process for said information processor;

storing the password in a password storage at said initial start-up process;

reading the password, which has been stored in the password storage in the storing, at the resume process; and unlocking the password-locked condition of the storage device using said read password input by the user at said initial start-up process, during said resume process said read password being used to unlock the password-locked condition of the storage device when resuming said normal operation from said power saving mode, thereby overriding the password protection of the storage device during the resume process.

25. A method according to claim 24, further comprising:

obtaining information relating to a setup/condition of a password lock of the storage device; and determining, in accordance with the obtained information, whether or not the password-locked condition of the storage device should be unlocked using the previously stored password.

26. A method according to claim 24, further comprising:

obtaining information relating to a setup/condition of a password lock of the storage device when the information processor shifts to the power saving mode; and determining, in accordance the obtained information, whether or not the password-locked condition of the storage device should be unlocked using the previously stored password during the resume process.

27. A method according to claim 26, further comprising unlocking the password-locked condition of the storage device using the read password when the obtained information indicates that the storage device is unlocked before the shift to the power saving mode and becomes password-locked at the time of the shift to the power saving mode.

* * * * *